United States Patent
Blanding et al.

(10) Patent No.: US 7,190,096 B2
(45) Date of Patent: Mar. 13, 2007

(54) FAULT-TOLERANT ELECTRO-MECHANICAL ACTUATOR HAVING MOTOR ARMATURES TO DRIVE A RAM AND HAVING AN ARMATURE RELEASE MECHANISM

(75) Inventors: David E. Blanding, Hawthorne, CA (US); Atsuo J. Watanabe, Gardena, CA (US)

(73) Assignee: The Boeing Company, Chicago, IL (US)

( * ) Notice: Subject to any disclaimer, the term of this patent is extended or adjusted under 35 U.S.C. 154(b) by 201 days.

(21) Appl. No.: 10/860,931

(22) Filed: Jun. 4, 2004

(65) Prior Publication Data
US 2005/0269887 A1   Dec. 8, 2005

(51) Int. Cl.
*H02K 16/00* (2006.01)
*H02K 7/10* (2006.01)

(52) U.S. Cl. .......................... 310/112; 310/80; 310/83; 74/89.26

(58) Field of Classification Search .................. 310/80, 310/112, 114, 83, 424.91, 424.92, 89.26–89.29, 310/490.03, 424.78, 424.86; 74/424.91, 74/424.92, 89.26–89.29, 490.03, 424.78, 74/424.86
See application file for complete search history.

(56) References Cited

U.S. PATENT DOCUMENTS

| | | | | |
|---|---|---|---|---|
| 2,860,266 A | * | 11/1958 | Schrader | 310/112 |
| 4,179,944 A | * | 12/1979 | Conner | 74/89.26 |
| 4,375,770 A | * | 3/1983 | Druet | 74/424.92 |
| 4,607,180 A | * | 8/1986 | Stoody | 310/80 |
| 4,858,491 A | * | 8/1989 | Shube | 74/665 B |
| 5,092,539 A | | 3/1992 | Caero | 244/75 R |
| 6,362,547 B1 | * | 3/2002 | Peterson et al. | 310/80 |
| 6,446,519 B1 | | 9/2002 | Biester | 74/89.15 |
| 6,453,761 B1 | | 9/2002 | Babinski | 74/89.34 |
| 6,791,215 B2 | * | 9/2004 | Tesar | 310/12 |
| 6,820,715 B2 | * | 11/2004 | Laurent et al. | 180/443 |
| 2005/0269887 A1 | * | 12/2005 | Blanding et al. | 310/112 |

FOREIGN PATENT DOCUMENTS

JP    2002153027    *   5/2002

* cited by examiner

*Primary Examiner*—Karl Tamai
(74) *Attorney, Agent, or Firm*—Timothy K. Klintworth; Wildman, Harrold, Allen & Dixon, LLP

(57) ABSTRACT

An electrical actuator comprises two or more electrical motors to drive a threaded screw ram. Each motor has an armature that drives a threaded roller screw that is engaged to the threaded screw ram. Each armature of each motor is independently engageable and/or dis-engageable with the ram. The motor armatures are engageable and disengageable by way of threaded roller screws, the ends of which are tapered to enable them to be lifted away from or lowered into engagement with the threaded ram.

13 Claims, 7 Drawing Sheets

US 7,190,096 B2

FAULT-TOLERANT ELECTRO-MECHANICAL ACTUATOR HAVING MOTOR ARMATURES TO DRIVE A RAM AND HAVING AN ARMATURE RELEASE MECHANISM

BACKGROUND OF THE INVENTION

This invention relates to actuators. An "actuator" is defined in the Merriam-Webster's Collegiate Dictionary, Tenth Edition as a mechanical device for moving or controlling something. Actuators perform myriad functions and enable many modern conveniences.

Aircraft for example, require actuators to fly. Flaps, spoilers and ailerons in each wing, each require an actuator. Actuators in the tail control the rudder and elevators. Actuators in the fuselage open and close the doors that cover the landing gear bays. Actuators raise and lower the landing gear. Actuators on each engine control thrust reversers by which the plane is decelarated.

In addition to uses in aircraft, actuators are used in computer disk drives to control the location of the read/write head by which data is stored on and read from the disk. Actuators are used in robots, i.e., in automated factories to assemble products. Actuators operate brakes on vehicles; open and close doors; raise and lower railroad gates and perform numerous other tasks of everyday life.

Prior art actuators fall into two general categories: hydraulic and electric with the difference between the two categories being the motive force by which movement or control is accomplished. Hydraulic actuators require a pressurized, incompressible working fluid, usually oil. Electric actuators use an electric motor, the shaft rotation of which is used to generate a linear displacement using some sort of transmission.

A problem with hydraulic actuators is the plumbing required to distribute and control the pressurized working fluid. In an airplane, a pump that generates high-pressure working fluid and the plumbing required to route the working fluid add weight and increase design complexity because the hydraulic lines must be carefully routed.

Electric actuators, which are powered and controlled by electric energy, require only wires to operate and control but a problem with prior art electrical actuators is their reliability. Windings of electrical motors are susceptible to damage from heat and water. Bearings on motor shafts wear out. The transmission between the motor and the load, and which is inherently more complex than the piston and cylinder used in a hydraulic actuator, is also susceptible to failure. While electrical actuators have advantages over hydraulic actuators, an electrically-powered actuator that provides increased reliability, would be an improvement over the prior art. Fault-tolerance, i.e., the ability to sustain one or more component failures or faults yet keep working, would provide an improvement over prior art electrical actuators.

SUMMARY OF THE INVENTION

A fault-tolerant, electrically-powered actuator uses two or more, independent integrated motor modules in the same housing to drive an output ram that can be extended from and retracted into a housing that encloses the electric motor module that drive the ram into and out of the housing. The integrated motor module (FIG. 2) is defined as a unit that consist of one or more electric motor armature/field unit that provide the driving function for an engaged or active roller scres nut assembly. The roller screw nut assembly (FIG. 2A) consists of helical threaded rollers, nut assembly directly coupled to a common screw shaft. The ram's outside surface is threaded. Since the output ram is threaded, the ram can be moved into or out of the housing by the rotation of one or more "drive nuts" that engage the threads of the output ram and which are rotated themselves but laterally fixed in place such that the output ram moves laterally on the rotation of the drive nut.

The "drive nut" is provided by roller screws that make up part of the motor's armature and which engage the threads on the output ram. When this "drive nut" rotates, its rotation causes the output ram to translate., i.e., move into or out of the housing. Reliability and fault tolerance are provided by the multiple motors and a drive nut armature in each motor that enables each motor to be separately disengagable and/or engagable.

DETAILED DESCRIPTION OF THE PREFERRED EMBODIMENT

Figure 1:
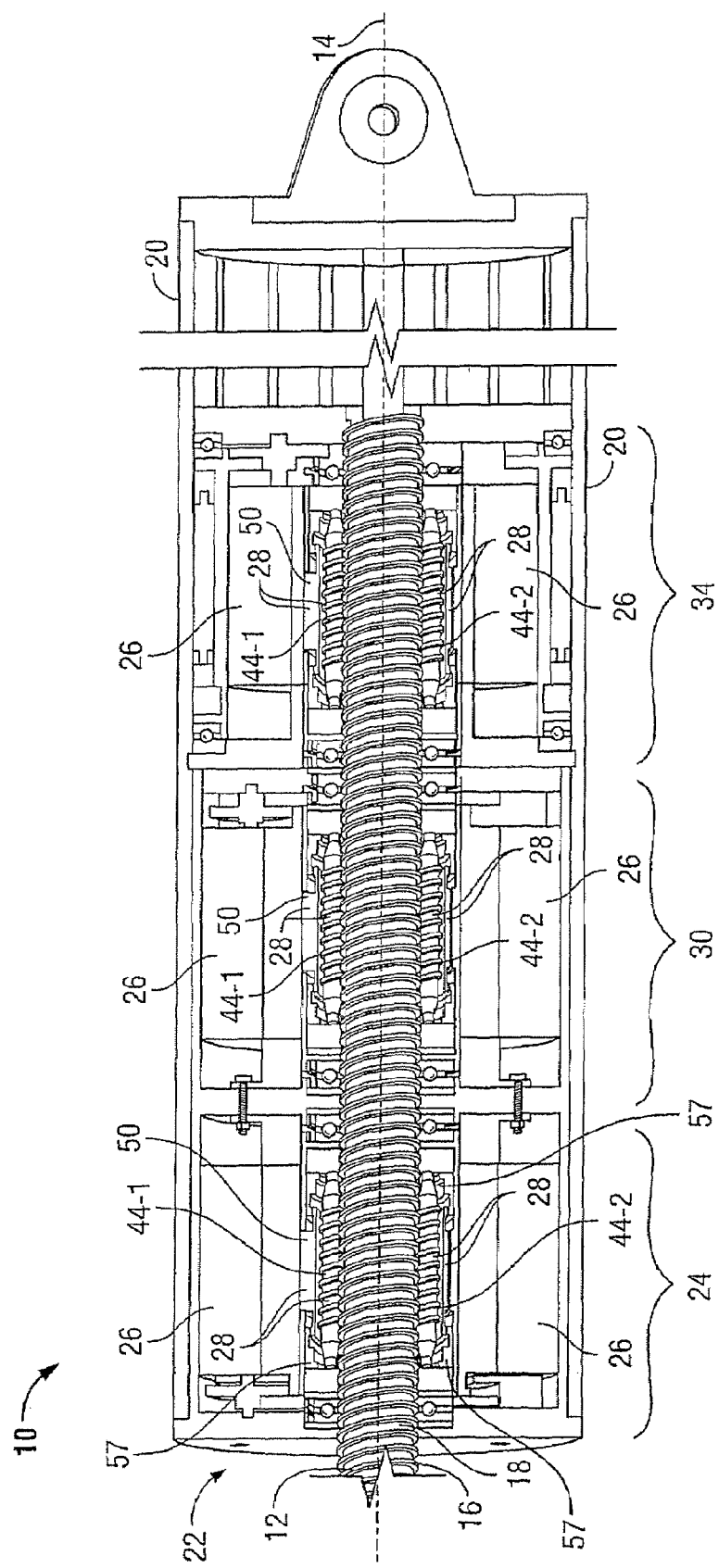
FIG. 1 is a cross-sectional diagram of a fault-tolerant electrical actuator.

FIG. 1 is a cross-sectional view of a preferred embodiment of an electrically-powered and fault tolerant electrical actuator 10.

Briefly, the actuator 10, is comprised of cylindrically-shaped housing 20 that encloses two or more integrated electrical motor modules (three shown) 24, 30 and 34 that can drive an output ram 12, the exterior surface 16 of which is helically threaded. A helical thread 18 (also referred to as "threads") on the output ram 12 surface are threaded into one or more complementary "drive nuts" within the housing that engage the threaded output ram 12 and which can rotate about the output ram 12 but which are laterally fixed in the housing, i.e., they cannot move along the length of the output ram 12. When the end of the output ram (not shown in FIG. 1) is connected to a machine, such as an aircraft's control surface, lateral movement motion of the ram 12 operates or controls the machine to which the output ram 12 is coupled.

The output ram 12 can be extended from and retracted into the housing simply by controlling the direction of rotation of at least one of the aforementioned "drive nuts" that engages the threaded surface 16. The drive nut rotation direction is readily changed by the electrical power provided to the field windings 26 of the motors 24, 30 and 34 that drive the output ram 12.

More particularly, the ram 12 has a central axis 14, owing to the fact that it's cylindrically shaped. Its exterior surface 16 has a helical thread or thread 18 in its exterior surface 16, such that the ram 12 can be considered to be "threaded" as is a bolt or screw. The helical "thread" 18 in the ram 12 exterior surface 16 enables the ram 12 to be axially moved by engaging the threads 18 of the output ram 12 with a rotating "drive nut" in the housing 20, which is structured and arranged to rotate about the axis 14 and engaged to the threads 18 but which is laterally fixed in the housing 20, i.e., it cannot move along the axis 14 of the output ram 12. The thread 18 pitch will affect the ram's speed (i.e., the rate at which it travels axially) as well as the load "seen" by the drive motors 24, 30 and 34.

Figure 7:
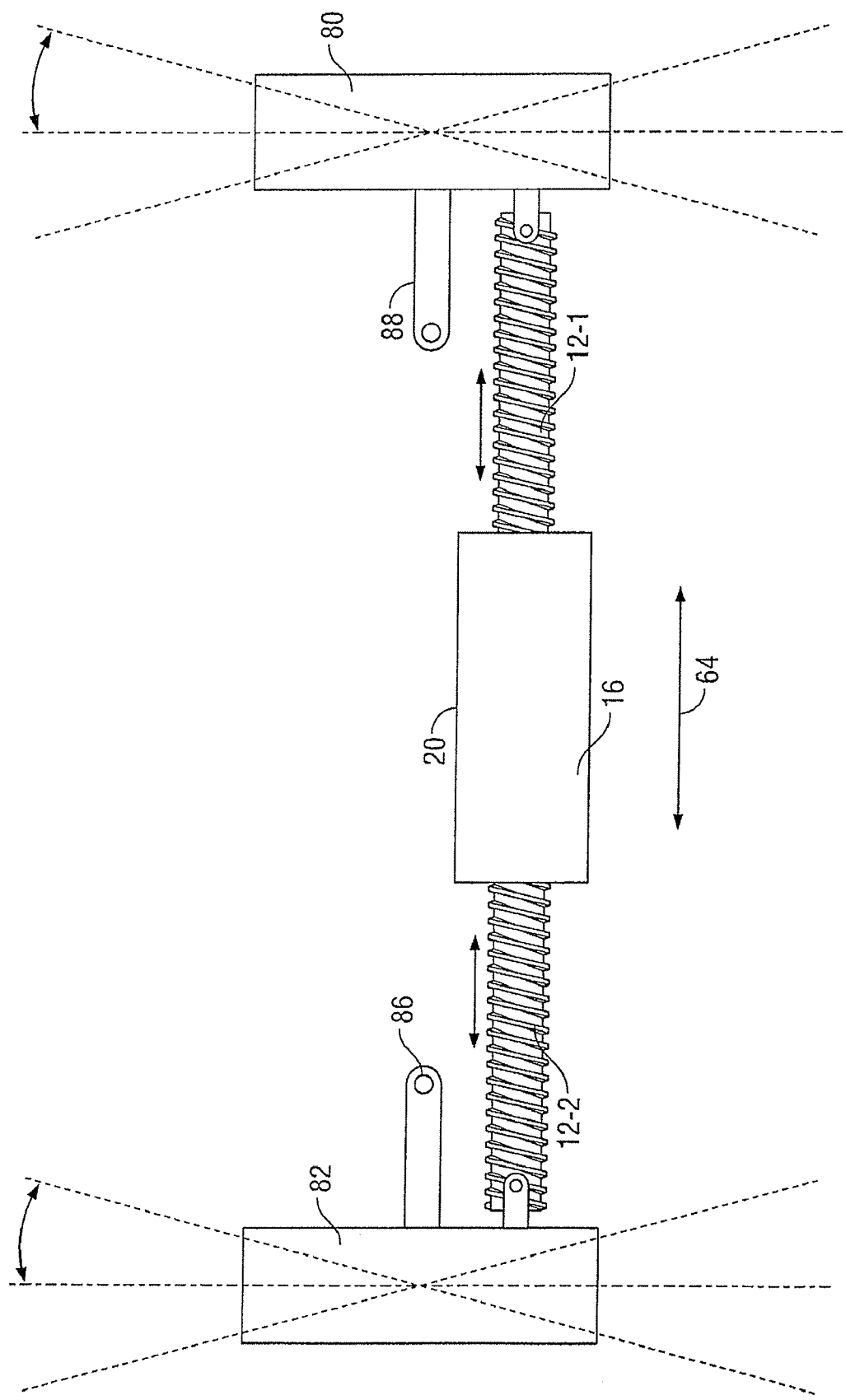
FIG. 7 shows a fault-tolerant actuator with a vehicle steering system.

As shown in FIG. 1, the housing 20 has at least one opening 22, in one end of the housing through which the output ram 12 can extend and retract so as to impart control or movement to a machine or machine part (not shown in FIG. 1). In at least one alternate embodiment shown in FIG. 7, which embodiment requires a double-acting output ram 12, the housing 20 has a second opening that is opposite the first opening 22. A second opening required to implement the embodiment of FIG. 7 is omitted from FIG. 1 for simplicity.)

Each motor 24, 30 and 34 has a stator 26, also known as a "field" or "field winding" shown in cross section in FIG. 1. As is well-known, application of an electrical current to the field winding 26 will induce one or more magnetic fields, which in turn, extend into the motor's armature and cause the armature to rotate. Each field winding 26 lies against the inside wall of the cylinder-shaped housing 20, which also acts as a heat sink for the motor windings.

The structure and operation of the armature 28 of each motor 24, 30 and 34 is the aforementioned "drive nut" that rotates about the ram 12 and which is axially fixed. Threaded roller screws in the armature 28 engage the threads 18 and can rotate about the output ram 12 but are laterally fixed. In so doing, the armature 28 of each motor acts as a "drive nut" that drives the output ram 12 but which also provides a capability of being decoupled from (or coupled to) the thread 18 on the output ram 12.

The armature 28 includes two or more helical-threaded roller screws, 44-1 and 44-2, evenly spaced around the output ram 12 and which engage the threads 18 in the output ram 12. The roller screws 44-1 and 44-2 are held in place axially along the output ram 12 axis by their engagement with the threads 18 in the output ram 12, but are freely rotatable around the ram 12 by way of a cage 50 (Shown in FIG. 2.) that is laterally restrained in the housing 20 by axial thrust bearings, not shown in the figures but well-known to those of ordinary skill in the art.

When the field 26 is energized, it causes the armature structure 28 to rotate about the output ram 12, in turn causing the roller screws 44 in the cage 50 and which engage the threaded output ram 12, to rotate around the ram 12 and exert a lateral force on the threads 18. The lateral force on the threads 18 cause the ram 12 to move laterally.

For purposes of this disclosure and claim construction, the term "armature" is used interchangeably with and is considered to be equivalent to a "rotor." In other words, a "rotor" is equivalent to an "armature" and vice versa. For example. Merriam-Webster's Online Dictionary defines an "armature" as "a usually rotating part of an electric machine (as a generator or motor) . . . " and defines a "rotor" as "the rotating member of an electrical machine". Similarly, the term "stator" is considered to be equivalent to a "field" winding.

Figure 2:
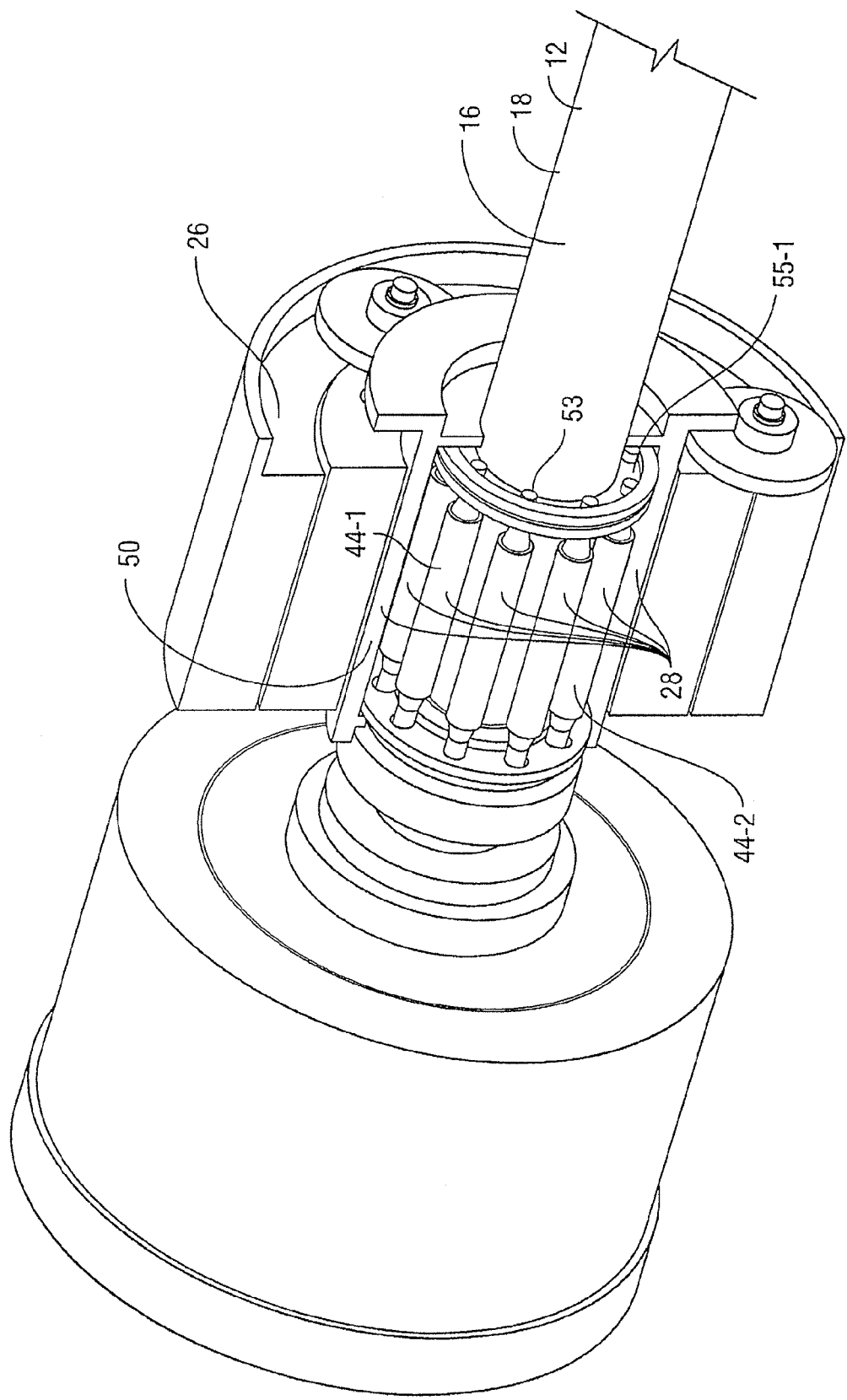
FIG. 2 is a perspective view of the roller screw nut to be used as the armature of an electrical motor used in the fault tolerant electrical actuator and showing a releasing clutch.

FIG. 2 shows the cage 50 and the included roller screws 44 in greater detail. The cage 50 radially separates two or more, helically-threaded roller screws 44-1 and 44-2 that mate with the threads 18 in the output ram 12. The threads of the roller screws 44 are sized and shaped to mate with the threads 18 on the surface 16 of the output ram 12 such that the roller screws 44 can smoothly rotate about the output ram 12. Those of skill in the art will appreciate that roller screw thread pitch should match the thread pitch of the output ram 12. Those of skill in the art will also appreciate that the roller screws 44 may be held in place axially along the output ram 12 axis by way of their helical threads mating with the threads 18 on the surface 16 of the output ram 12.

Figure 3:
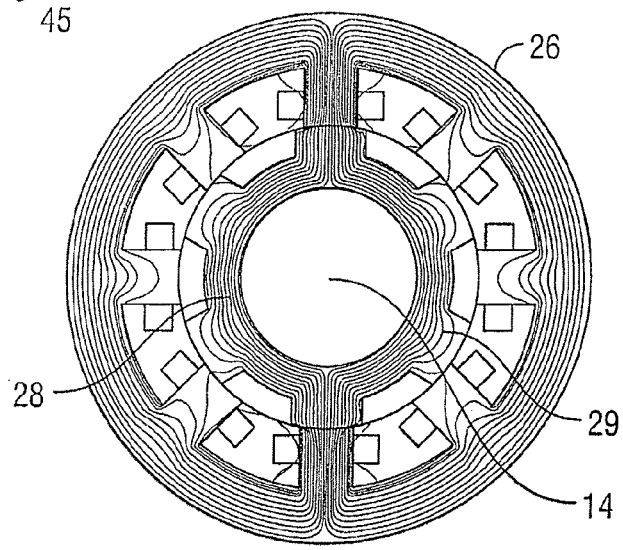
FIG. 3 depicts the electrical poles of the stator and armature of an electric motor, the armature of which engages the output ram of the electrical actuator.

That the cage 50 with the included roller screws 44 functions as an armature can be seen in the electrical representation of one of the motors shown in FIG. 3. In FIG. 3, the armature 28 has six poles 29 around the axis 14, with each pole 29 being formed by and corresponding to one of the band sections 51 that extend between the bearing caps 55-1 and 55-2. Each pole 29 acts to enclose the roller screws 44 as well as providing a path for magnetic lines of flux. The armature structure 28 will rotate in response to the magnetic fields created about the armature 28 by the stator 26. Rotation of the armature structure 28 causes the roller screws 44 to rotate. (Those of skill in the art will recognize that the roller screws 44 will rotate about their axes of rotation albeit in an opposite direction than the armature's rotation 28.)

Figure 2A:
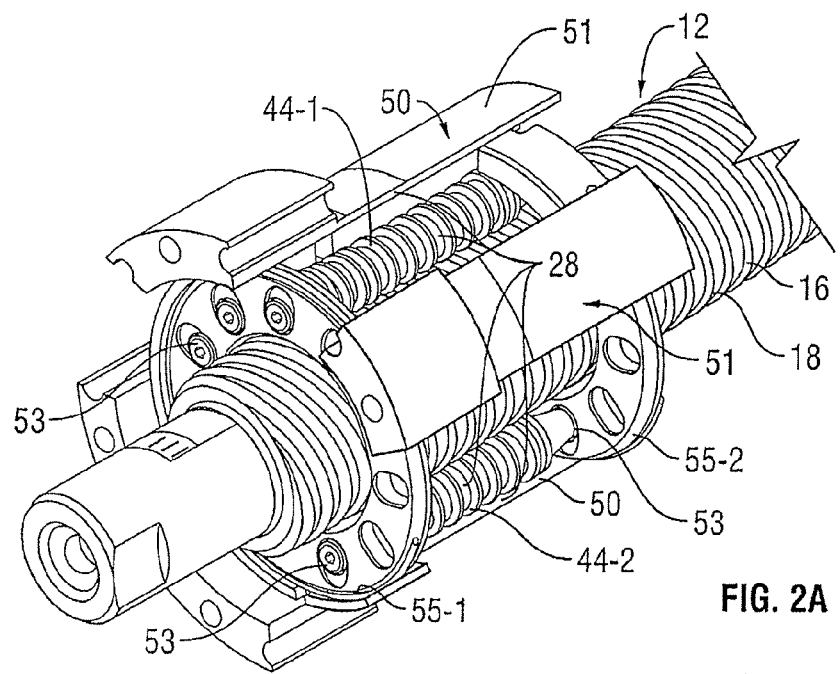
FIG. 2A is a roller screw nut assembly.

Referring to FIG. 2A, the metal bands 51 that run parallel to the roller screws 44 cany magnetic flux lines. They also strengthen the cage 50 and thereby help maintain the radial separation between separate the roller screws 44-1 and 44-2. Journals 45 at the ends of the roller screws 44 (shown in FIG. 2B) ride in small bearing holes 53 in the opposing bearing caps 55-1 and 55-2.

The taper sections 43 in the roller screw 44 provides a structure by which the roller screws 44 can be disengaged from the helical threads of the output ram 12. The roller screws 44 are disengaged using a complementary taper in the bearing caps 55-1 and 55-2, which can slide "under" the taper section 43, causing the roller screw 44 to be lifted upward, disengaging the roller screw 44 from the output ram 12. The bearing caps 55-1 and 55-2 are urged toward each other to disengage the roller screws 44 when the motor fails.

During operation, the fault-tolerant electromechanical actuator or "EMA" generates signals such as voltage, current, speed and position. A microprocessor, not shown, monitors voltage, current, speed and position anddetects when an excessive torque is being developed by one or more of the driving motors, typically by way of an unusually-high current drawn by a motor.

Figure 4:
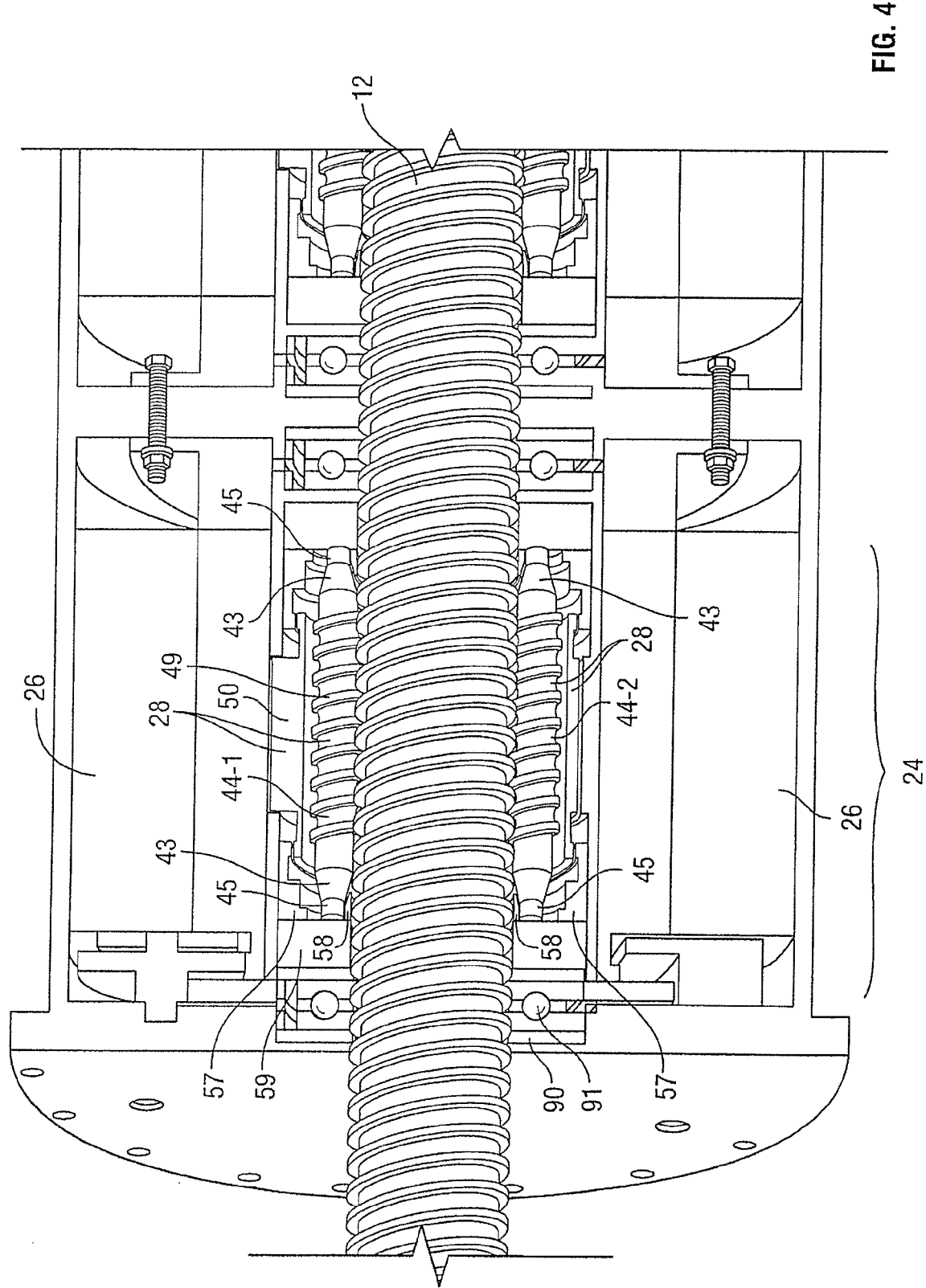
FIG. 4 is an isolated view of one motor in the housing of the electrical actuator and a portion of the output ram.

Referring to FIG. 4, upon determining that an excessive torque is being attempted, the microprocessor or other controller trips a ramp and lock mechanism (57) that totally disengages the rollers (44) of the problematic motor from the screw (12). The ramp and lock mechanical (57) requires an electromagnetic actuation device (59) that provides lateral movement of ramp and lock mechanism (57) to lift the roller (44) from the screw (12) and lock itself into a segmented roller cage/nut (50).

When the ramp and lock mechanism (57) is required, i.e., when there is an excessive amount of current drawn, the microprocessor or other controller applies a voltage/current to coil (90). The coil (90) becomes an electromagnet and produces magnetic line of flux. This flux is then transferred from the coil (90) through small air gaps in the thrust bearing (91) to an opposing magnetic field on the ramp and lock mechanism (57). As the current increase the magnetic flux builds causing the ramp and lock mechanism (57) to move in such a way that the roller (44) is lifted upward and away from contacting the screw threads. Once engaged, the ramp and lock mechanism (57) is locked in place on the segmented roller cage/nut (50) totally eliminating the motor module from any further operation or contact with the screw (12). Under normal operations the ramp and lock mechanism (57) is free of any magnetic contact with the electrical coil and the roller (44) is fully engaged with the screw (12) and the motor module is fully functional.

In a preferred embodiment, all of the motors 24, 30 and 34 in the housing are engaged to the thread 18 in the output ram 12. All of the motors are powered and help drive the output ram 12. In such an embodiment, the motors share the load presented by the output ram 12. When a motor fails, structure in the armature 28 disconnect the armature 28 from the thread 18 in the output ram 12 enabling other motors to assume the load from the ram 12 without interference from the failed motor.

In one alternate embodiment, all of the motors are engaged to the thread 18 in the output ram 12, but one motor is powered and drives the load presented by the output ram 12. The other motors in the housing 20 "go along for the ride" but do not provide any motive assistance. When the driving motor fails, structure in the failed motor's armature 28 disconnects the armature 28 from the thread 18 in the output ram 12 enabling one or more of the other motors to assume the load from the ram 12 without interference from the failed motor.

In yet another alternate embodiment, two or more motors are engaged to the thread 18 in the output ram 12 and are powered to drive the load presented by the output ram 12 and thereby share the load between them. A single additional motor is also engaged but not powered so as to be available as a "back-up" or redundant motor. When a driving motor fails, structure in the failed motor's armature 28 disconnects the failed motor's armature 28 from the thread 18 in the output ram 12 enabling one or more of the other motors to assume the load from the ram 12 without interference from the failed motor.

In yet another alternate embodiment, only one motor of multiple motors is engaged to the thread 18 in the output ram 12 and handles the output ram 12 load. Other motors in the housing 20 are "back-up" or redundant motors. When the driving motor fails, structure in the failed motor's armature 28 disconnects the failed motor's armature 28 from the thread 18 in the output ram 12. In this embodiment, structure in the armature of the other motors engages one or more armatures of the other motors by which it (or they) assume the load from the ram 12 without interference from the failed motor.

Referring to FIGS. 1, 2, 2A and 4, a motor can be disengaged from the thread 18 in the output ram 12 when the roller screws 44 are lifted away from the threads 18, allowing the cage 50 to rotate freely about the output ram 12. The roller screws 44 can be lifted away from the thread 18 using the tapered sections 43 (shown in FIG. 2) between the straight journal section 45 and the threaded section 49. When a complementary taper in the bearing caps 55-1 and 55-2 or in a clutch mechanism, is forced under and against the tapered sections 43, a taper that slides under the tapered sections 43 will cause the roller screws 44 out of engagement with the thread 18.

Many of the aforementioned embodiments are structured so that all of the motor armatures are engaged to the thread 18 in the output ram 12. In those embodiments, a failed motor is disengaged from the output ram 12 when a motor fails using the tapered section 43 and a complementary taper in the bearing cap 55-1 and 55-2 or a clutch. A roller screw 44 that is initially disengaged using the tapered sections can thereafter be engaged to the thread 18 by backing a complementary taper away from the taper section 43 in the roller screw 44. In alternate embodiments, wherein not all motors are initially engaged, a failed motor is disengaged as describe above with a back-up or motor being engaged to the output ram 12 by lowering the rollers so that it can operate the actuator 10.

FIG. 4 better illustrates the ramp and lock mechanism 57 at both ends of the cage 50, which prevent the cage 50 from moving laterally. As shown in FIG. 4, complementary tapers 58 in the ramp and lock mechanism 57 will lift the roller screw 44 out of engagement if the ramp and lock mechanism 57 is urged toward the roller screw 44. The displacement of the ramp and lock mechanism is controlled by an electromagnetic actuator and microprocessor.

Whether the ram 12 extends away from the housing 20 or retracts into the housing 20 is determined by the armature's rotation direction. The armature's rotation direction is in turn determined electrically. Therefore, the output ram 12 of the actuator 10 can be moved in different directions simply by changing the electrical power source.

In addition to changing the output ram's direction electrically, the output ram 12 speed can be determined electrically. In the case of a D.C. motor, rotational speed is determined by the applied voltage amplitude. In the case of a synchronous A.C. motor, rotational speed is determined by the frequency of the applied A.C. voltage. As is well-known, an A.C. induction motor speed can be varied somewhat by changing the voltage amplitude but also by changing the A.C. duty cycle.

For any given motor speed, thread pitch of the ram 12 will affect the displacement speed of the output ram 12. While a relatively large number of threads per inch will require more motor revolutions, per unit of linear displacement, increasing the threads per inch will also decrease the amount of force that the driving motor "sees" from the output ram 12.

The ease with which the output ram 12 direction and speed can be changed are but two significant advantages that the actuator 10 has over prior art hydraulic actuators. Fault-tolerance and hence reliability of the actuator 10 is achieved by having multiple motors drive the output ram 12, such that the motors can be disengaged if and when they fail.

Referring again to FIG. 1, a second motor 30 is shown in the housing 20 immediately to the right of the first motor 24. The structure and operation of the second motor 32 is preferably identical to the first motor 24. Alternate embodiments include having a third motor 34 as well. Like the armature of the first motor 24, the armature of the second motor 30 is provided by a cage 50 with two or more roller screws 44-1 and 44-2.

Figure 2B:
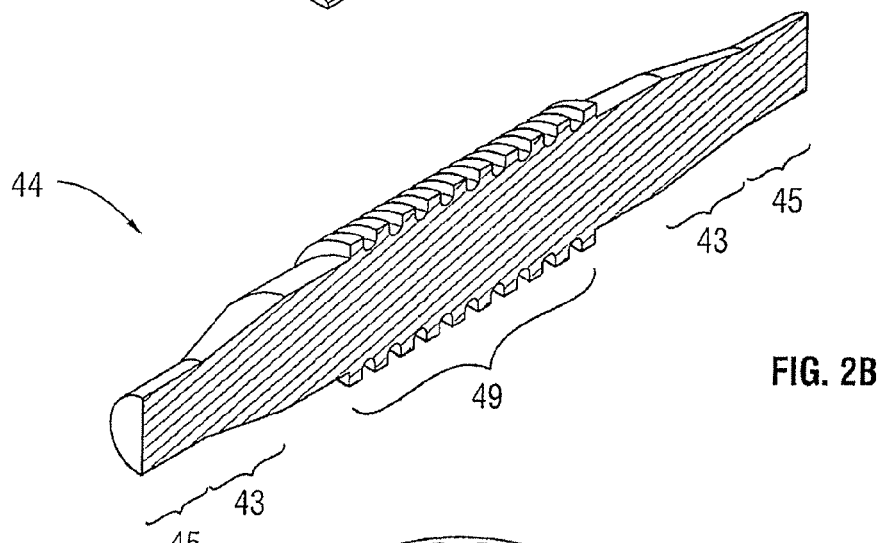
FIG. 2B is a helical thread roller

As shown in FIG. 2B, the roller screws 44 have a central threaded section 49. Tapers 43 are just inside the journal bearing sections 45. The journal sections 45 ride in the bearing caps 55-1 and 55-2 that are at each end of the roller screws 44 and freely rotate about the output ram 12 and which do not engage the threads in the output ram 12.

As set forth above, fault tolerance is provided by the ability to disengage one motor when it fails so that another motor can continue to operate and take up the load. As can be seen in FIG. 4, the output ram 12 can be engaged and disengaged from the rotor 28 depending on whether the roller screws 44 in the armature cage are initially engaged or disengaged with the threads of the output ram 12. The roller screws 44 can be disengaged from the output ram and hence the motor 24 disengaged from the output ram 12, by sliding the complementary tapers 58 of the ramp and lock mechanism 57 against the tapered sections 43 of the roller screw 44. In so doing, the roller screws 44 are lifted out of engagement with the output ram 12, physically disconnecting the motor from the output ram 12.

The ramp and lock mechanism 57 is forced along the axis of the roller screw and against the roller screws 44 by either a mechanical or electrical clutch (not shown), which will force the complementary taper 58 against the roller screw taper 43 or pull the complementary taper 58 away from the taper section 43, depending on whether the motor is to be disengaged or engaged from the output ram 12. By lifting the roller screw 44 of one motor out of the threads of the output ram 12 the armature 28 of that motor can be disengaged from the ram 12. By lowering the roller screw of a different motor into the threads of the output ram 12, the other motor can be engaged with the output ram 12.

The tapered face on the complementary taper 58, or any other structure that lifts the roller screws 44 away from the output ram or that lowers the roller screws into engagement with the output ram 12, should be considered to be a roller-engaging/roller-disengaging mechanism that operably couples and de-couples an armature/rotor of a motor with the helical thread and the output ram. In so doing, the complementary taper 58, and/or its tapered surfaces in combination with the tapered section of the roller screw act as a mechanism for engaging or disengaging the motors from the output ram 12.

As set forth above in the background of the invention, hydraulic and electrical actuators perform myriad tasks. The electrically powered linear actuator described above and depicted in FIGS. 1–4 can be used in a variety of applications.

Figure 5:
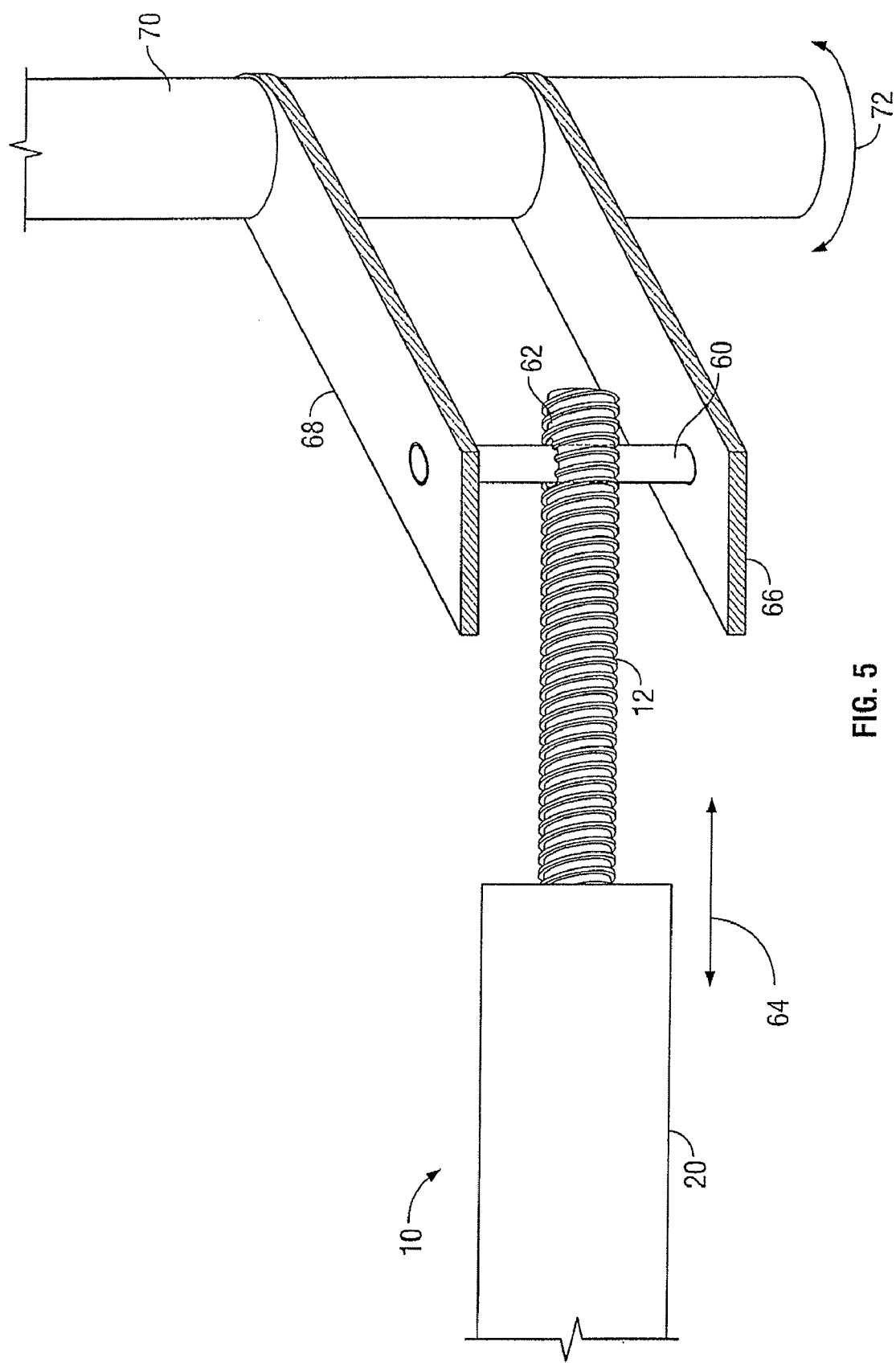
FIG. 5 shows an fault-tolerant actuator with crank arm driving a drive shaft.

As is well-known, a "journal" is a spindle or shaft that turns in a bearing. In its most general application, and as depicted in FIG. 5, the output or distal end 62 of the electrically powered linear actuator 10 is attached to a journal 60 of a crank arm 68. The journal 60 accommodated by an opening in the ram 12 at its distal end 62 and in which the journal 60 pivots as the output ram 12 reciprocate as shown by reference numeral 64.

As shown, the displacement of the journal 60 at the end of the crank arm 68 will in turn cause the drive shaft 70 to oscillate about its axis of rotation, as indicated by reference number 72. In rotating machines, the actuator 10 can effectuate rotation by its reciprocating displacement using structure shown in FIG. 5.

Aircraft are well-known to have wings that are attached to a fuselage. Control surfaces in the wings control the rate of climb and descent, among other things. The tail section attached to the rear of the fuselage provides steering and maneuverability. An engine provides thrust and can be attached to the plane at the wings, in the tail or to the fuselage. Inasmuch as aircraft structures are well-known, their illustration is omitted here from for simplicity.

As set forth above, prior art actuators controlled the movement of flight control surfaces in the wings, tail, landing gear, landing gear bay doors and as well as engine thrust reversers. In yet another embodiment of the invention shown in FIG. 6, the output end 62 of the output ram 12 is coupled to a pivot point 74 of a control surface 76 of an aircraft (not shown for clarity, but well known in the art). Translation (movement) of the output ram 12 in the direction indicated by the arrows 64 is but one way that the actuator 10 can cause a control surface, e.g., spoilers, flaps, elevators, rudder or ailerons, to move and thereby control the aircraft. Similar translation can control other flight control surfaces, fuselage doors, landing gear and/or thrust reverses.

Figure 6:
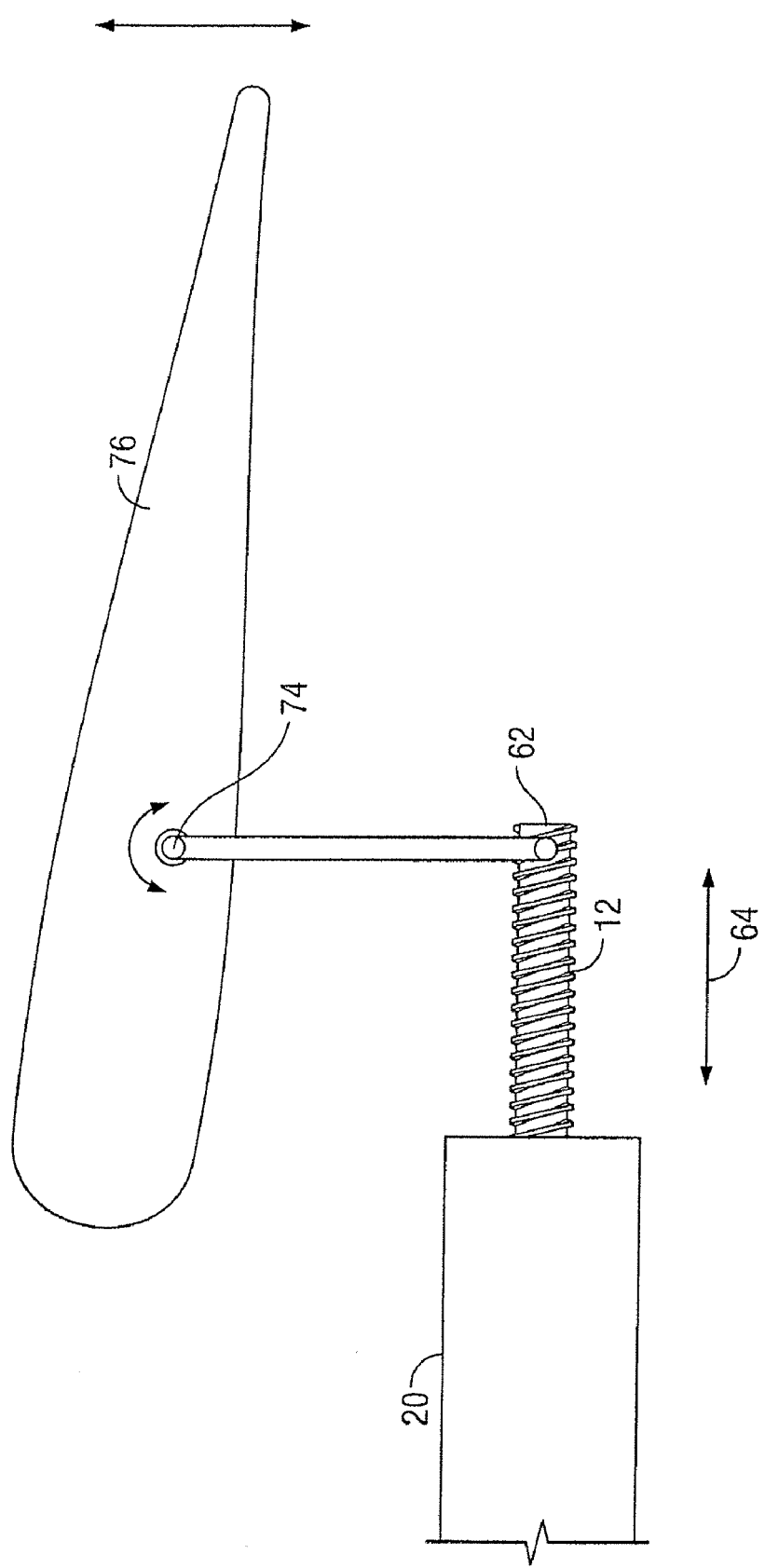
FIG. 6 shows a fault-tolerant actuator with a flight control surface of an aircraft.

Those of ordinary skill in the art will recognize aircraft as having the aforementioned well-known prior art structure, but also including a fault-tolerant electrical actuator 10 as described herein and as shown in FIG. 6. The safety and reliability of an aircraft might therefore be improved by using the actuator 10 within a wing, fuselage or tail section as needed to operate flight control surfaces, landing gear, landing gear doors as well as an engine thrust reverser.

In yet another embodiment shown in FIG. 7, the output ram 12 extends through both ends of the actuator housing 20. One side or end of the output ram 12-1 is connected to a first steerable wheel 80 of a vehicle. The other side or end 12-2 is connected to a steering linkage for another steerable wheel 82. As the output ram 12 translates in the direction indicated in the reference number 64, the steerable wheels 80 and 82 rotate upon the pivot points or axes 86, 88 by which the steerable wheels 80, 82 are controlled.

Inasmuch as automobiles and trucks are well-known to have at least one steerable wheel (in the case of a three-wheeler), a chassis or frame to which the wheel is rotatably coupled, a body with doors, an engine and a transmission, and brakes, all of which are well-known and not requiring depiction, a significant weight reduction might be possible by replacing a hydraulic actuator used to control steering with a high-reliability, fault-tolerant actuator as described above.

Other embodiments of the electrically powered linear actuator would include use as a power source for a lift for a door by appropriately coupling the output ram to the mechanisms to which loads could be lifted and doors opened.

The preferred embodiment of the electrically powered actuator disclosed and claimed herein employed DC motors because they are readily reversible and their output speed easily controllable. Alternate embodiments would include reversible AC motors as well as stepper motors however. Those of skill in the art will recognize however that stepper motors require more complex electronics than those of DC or AC motors.

By providing two or more motors that are fixed in a housing, each of which is independently coupled to or releasable from, a helically threaded output shaft, an electrically powered, fault-tolerant linear actuator can be realized.

What is claimed is:

1. An electrically-powered linear actuator comprising:
   an output ram (hereafter the "output ram") having a central axis and an exterior threaded surface;
   a housing having a first opening through which the output ram extends and retracts;
   a first electric motor (hereafter the "first motor") fixed in said housing, said first motor providing a first stator and a first armature within the stator that rotates about the axis of the output ram, said first armature being carried in a manner to prevent its axial movement along the output ram axis while permitting its rotation about the output ram axis, the first armature's rotation causing the output ram to retract into or extend from the housing when the first armature is engaged with the output ram's threaded surface;
   a second electric motor (hereafter the "second motor") fixed in said housing and adjacent the first electric motor, said second motor providing a second stator around the output ram and a second armature within the second stator that rotates about the axis of the output ram, said second armature being carried in a maimer to prevent its axial movement along the output ram axis while permitting its rotation about the output ram axis, the second armature's rotation causing the output ram to retract into or extend from the housing when the second armature is engaged with the output ram's threaded surface; and an armature releasing mechanism, operatively coupled to at least one of the first armature and the second armature to decouple the corresponding armature from the output ram upon the existence of a fault.

2. The electrically-powered linear actuator of claim 1 wherein:
both said first armature and said second armature are initially engaged with the threaded surface of the output ram; and
said armature releasing mechanism decouples a corresponding armature on the failure of the corresponding motor.

3. The electrically-powered linear actuator of claim 1 wherein:
one of said first armature and said second armature are initially engaged with the threaded surface of the output ram;
said armature releasing mechanism decouples the engaged armature on the failure of the corresponding motor; and
after the other armature is engaged with the threaded surface of the output ram, the at least one annature releasing mechanism decouples the previously engaged armature.

4. The electrically-powered linear actuator of claim 1 wherein:
the armature releasing mechanism is replaced by at least one armature engaging mechanism, which is operatively coupled to at least one of the first armature and the second armature and which causes a corresponding armature to engage the threaded surface of the output ram.

5. The electrically-powered linear actuator of claim 1 further including a third electric motor (hereafter the "third motor") fixed in said housing, said third motor providing a third stator around the output ram and a third armature within the third stator that rotates about the axis of the output ram, said third armature being carried in a manner to prevent its axial movement along the output ram axis while permitting its rotation about the output ram axis, the third armature's rotation causing the output ram to retract into or extend from the housing when the third armature is engaged with the threaded surface of the output ram; and at least one armature releasing mechanism, operatively coupled to at least one of the first armature, the second armature and the third armature to decouple the corresponding armature from the output ram.

6. The electrically-powered linear actuator of claim 1 wherein the first armature and the second armature include a roller screw having an axis substantially parallel to the output ram axis, being carried in a manner to prevent its axial movement along the output ram axis while permitting its rotation about the output ram axis, said roller screw having a helical screw that mates with and releasably engages the threaded surface of the output ram such that rotation of the at least one roller screw causes the output ram to retract into or extend from the actuator housing.

7. The electrically powered linear actuator of claim 1, wherein said cylindrical output ram has an output end that is distal to the housing, and wherein said electrically powered linear actuator is further comprised of at least one of:
a journal, a linear displacement of which causes rotation of a machine part;
a control surface for an aircraft;
a steerable wheel for a vehicle;
a lift; and
a door;
coupled to the output end of the output ram.

8. The electrically powered linear actuator of claim 1, wherein said first and said second motors are D.C. motors.

9. The electrically powered linear actuator of claim 1, wherein said first and second motors are reversible AC motors.

10. The electrically powered linear actuator of claim 1, wherein said first and second motors are stepper motors.

11. An electrically-powered linear actuator comprising:
a cylindrical output ram (output ram) having a central axis and an exterior surface circumscribed by a helical thread;
a housing having a first opening through which the output ram extends and retracts;
a first electric motor (hereafter the "first motor') fixed in said housing, said first motor providing a first stator around the output ram and a first armature within the stator that rotates about the axis of the output ram, said first armature being comprised of a first roller screw, that rotatably engages the helical thread but which does not move axially along the output ram axis such that the first armature's rotation causes the first roller screw to rotate in the helical thread of the output ram, thereby causing the output ram to retract into or extend from the housing;
a second electric motor (hereafter the "second motor") fixed in said housing, said second motor providing a second stator around the output ram and a second armature within the second stator that rotates about the axis of the output ram, said second armature being comprised of a roller screw, that rotatably engages the helical thread but which does not move axially along the output ram axis such that the second armature's rotation causes the second roller screw to rotate in the helical thread of the output ram, thereby causing the output ram to retract into or extend from the housing; and
a armature releasing mechanism, operatively coupled to at least one of the first roller screw and the second roller screw to decouple the corresponding armature from the helical thread of the output ram upon the failure of the corresponding motor.

12. An aircraft comprising:
a) two wings, each having an actuator-controllable flight surface;
b) a fuselage to which the two wings are attached;
c) a tail section attached to the fuselage, having at least one actuator-controllable flight surface;
d) at least one engine coupled to at least one of the: the two wings; the fuselage; and the tail section; and
e) an electrically-powered, fault-tolerant actuator (the "actuator) operatively coupled to at least one of the actuator controllable flight surfaces, the actuator comprising:
i) an output ram having a central axis and an exterior surface circumscribed by a helical thread;
ii) a housing having a first opening through which the output ram extends and retracts;

iii) a first electric motor (hereafter the "first motor') fixed in said housing, said first motor providing a first stator around the output ram and a first armature within the stator that rotates about the axis of the output ram, said first armature being carried in a manner to prevent its axial movement along the output ram axis while permitting its rotation about the output ram axis, the first armature's rotation causing the output ram to retract into or extend from the housing when the first armature is engaged with the helical thread in the output ram;

a second electric motor (hereafter the "second motor') fixed in said housing, said second motor providing a second stator around the output ram and a second armature within the second stator that rotates about the axis of the output ram, said second armature being carried in a manner to prevent its axial movement along the output ram axis while permitting its rotation about the output ram axis, the second armature's rotation causing the output ram to retract into or extend from the housing when the second armature is engaged with the helical thread in the output ram; and a armature releasing mechanism, operatively coupled to at least one of the first armature and the second armature to decouple the corresponding armature from the output ram upon the existence of a predetermined condition within one of the motors.

13. A vehicle comprising:
a) a chassis;
b) at least one steerable wheel coupled to the chassis;
c) an electrically-powered, fault-tolerant actuator (the "actuator) operatively coupled to the at least one steerable wheel, the actuator comprising:

i) an output ram having a central axis and an exterior surface circumscribed by a helical thread;
ii) a housing having a first opening through which the output ram extends and retracts;
iii) a first electric motor (hereafter the "first motor') fixed in said housing, said first motor providing a first stator around the output ram and a first armature within the stator that rotates about the axis of the output ram, said first armature being carried in a manner to prevent its axial movement along the output ram axis while permitting its rotation about the output ram axis, the first armature's rotation causing the output ram to retract into or extend from the housing when the first armature is engaged with the helical thread in the output ram;

a second electric motor (hereafter the "second motor') fixed in said housing, said second motor providing a second stator around the output ram and a second armature within the second stator that rotates about the axis of the output ram, said second armature being carried in a manner to prevent its axial movement along the output ram axis while permitting its rotation about the output ram axis, the second armature's rotation causing the output ram to retract into or extend from the housing when the second armature is engaged with the helical thread in the output ram; and a armature releasing mechanism, operatively coupled to at least one of the first armature and the second armature to decouple the corresponding armature from the output ram upon the existence of a predetermined condition within one of the motors.

* * * * *